United States Patent [19]
Yoshida et al.

[11] Patent Number: 5,667,888
[45] Date of Patent: Sep. 16, 1997

[54] COLOR FILTERS AND METHODS OF MANUFACTURING THE SAME

[75] Inventors: Akihiko Yoshida; Masaki Ikeda, both of Hirakata; Kunio Kimura, Kyoto; Atsushi Nishino, Neyagawa; Hiroyuki Nakazumi, Kawachinagano; Noboru Tohge, Yamatokoriyama; Tsutomu Minami, Sayama, all of Japan

[73] Assignee: Matsushita Electric Industrial Co., Ltd., Osaka, Japan

[21] Appl. No.: 697,476

[22] Filed: Aug. 26, 1996

Related U.S. Application Data

[63] Continuation of Ser. No. 375,135, Jan. 18, 1995, abandoned, which is a continuation of Ser. No. 46,114, Apr. 9, 1993, abandoned, which is a continuation of Ser. No. 686,063, Apr. 16, 1991, abandoned.

[30] Foreign Application Priority Data

Apr. 18, 1990 [JP] Japan ............ 2-101936
Apr. 19, 1990 [JP] Japan ............ 2-103479

[51] Int. Cl.$^6$ ........................... B32B 17/06
[52] U.S. Cl. .......... 428/336; 106/287.1; 106/287.12; 106/287.19; 106/436; 359/580; 359/581; 359/589; 359/885; 428/206; 428/207; 428/210; 428/426; 428/428; 428/429; 428/446; 428/918
[58] Field of Search ............ 106/287.1, 287.12, 106/287.16, 287.17, 287.18, 287.19, 436; 359/580, 581, 589, 885; 428/206, 207, 210, 323, 328, 331, 336, 426, 428, 429, 446, 918; 501/12

[56] References Cited

U.S. PATENT DOCUMENTS

| | | | |
|---|---|---|---|
| 3,087,829 | 4/1963 | Linton | 106/291 |
| 3,421,921 | 1/1969 | Junge et al. | 106/287 |
| 3,574,651 | 4/1971 | Nitzsche et al. | 106/287.1 |
| 4,421,803 | 12/1983 | Czeiler et al. | 428/35 |
| 4,435,219 | 3/1984 | Greigger | 106/287.16 |
| 4,671,990 | 6/1987 | Jada et al. | 428/266 |
| 4,929,278 | 5/1990 | Ashley et al. | 106/287.12 |

FOREIGN PATENT DOCUMENTS 55-20222  2/1980  Japan.

*Primary Examiner*—D. S. Nakarani
*Attorney, Agent, or Firm*—Panitch, Schwarze, Jacobs & Nadel, P.C.

[57] ABSTRACT

The composite layer according to the present invention comprises a substrate and a colored layer formed on the surface of this substrate. This colored layer contains a transparent layer and a coloring agent dispersed within the transparent layer, and this transparent layer is made of an inorganic gel or glass material, while the coloring agent contains dyes or pigments. The composite layers of the present invention are suitable for use in products such as construction materials with the appearance of marble, colored glass materials for decorative purposes, or color filters.

14 Claims, 7 Drawing Sheets

COLOR FILTERS AND METHODS OF MANUFACTURING THE SAME

This Application is a continuation of U.S. patent application Ser. No. 08/375,135 filed Jan. 18, 1995, now abandoned, which is a continuation of U.S. patent application Ser. No. 08/046,114 filed Apr. 9, 1993, now abandoned, which is a continuation of U.S. patent application Ser. No. 07/686,063 filed Apr. 16, 1991, now abandoned.

BACKGROUND OF THE INVENTION

1. Field of the Invention

The present invention relates to a composite layer which can be used in the preparation of colored glass material for ornamental purposes, in the preparation of composites applicable as construction materials including walling, flooring, and kitchen counter materials, etc. (in particular, materials commercially marketed under the names artificial marble, artificial granite, etc.), as well in the preparation of products such as color filters, etc., and a method of manufacturing the same.

The present invention particularly relates to color filter which can be employed for purposes such as color compensation in VTR cameras, color separation used in colored copying machines such as input colored scanners, etc., RGB color separation in liquid crystal color matrices, general photographic applications, special purposes such as UV cutoff, etc., and to a method of manufacturing the same.

2. Description of the Prior Art

The coloring of glass arises from a nonuniformity in the degree to which light of the various wave lengths contained in the visible spectrum is transmitted when visible light passes through the glass. Utilizing this property, four principal methods of manufacturing colored glass have hitherto been developed and used, as follows.

(a) Ions of transition metals or rare earth elements are confined within the glass, and the light of prescribed wave lengths is absorbed by electron transitions in these metal ions.

(b) Minute particles of chemical elements or compounds are dispersed within the glass in colloidal form, and light is scattered and/or absorbed by these colloids.

(c) Light is absorbed by color centers created by exposing the glass to radiation, etc.

(d) Color is imparted by coating the surface of the glass with coating materials containing organic dyes, pigments, etc., or by vapor deposition of a metallic film.

Metal ions such as titanium, vanadium, or chromium, etc., are used as a colorant in the aforesaid method (a). When this method is employed, the colors change in a complex manner owing to the changes in coordination numbers of the metal ions which are determined by the specific composition of the glass.

In method (b), coloration is effected through colloid precipitation induced by heat treatment. Copper and gold are used to create red colors, while silver is used for yellow coloration.

Method (c) is used for the creation of certain special colors.

Method (d) is the so-called coating method, and involves no coloration arising from the composition of the glass itself.

The formation of composite materials consisting of glass and synthetic resins from compositions containing, e.g., glass particles, reaction hardened synthetic resins, and flaky aluminum powder, has previously been proposed (Japanese Laid-Open Patent Publication No. 55-20222); construction materials such as artificial marble, etc., can be formed from such compositions. Hitherto, there have existed three main types of composition used in composites for the fabrication of artificial marble and artificial granite, as follows;

The first type comprises a composite material of crushed natural rock particles and synthetic resins.

The second type comprises a composite material of glass powder and synthetic resins, as indicated in the above-cited announcement (Japanese Laid-Open Patent Publication No. 55-20222).

The third type comprises a composite material of aluminum hydroxide powder end synthetic resins.

The methods which have been employed for the coloration of these composite materials consist of the use of naturally colored rock, or of glass particles colored with organic pigments, or of glass colored with metallic ions.

The range of colors which can be obtained by conventional methods of coloring glass with metallic ions or metallic colloids is limited. That is, the arbitrary control of the wave length peak of the light absorbed or transmitted by the glass is difficult. Moreover, colored glass fabricated by the aforementioned costing method, based upon application of coating materials containing dyes or pigments, is subject to fading when exposed to ultraviolet radiation, heat, or moisture, etc.

As regards the fabrication of artificial marble, the appearance of composite materials employing natural rock as a colorant conveys no impression of transparency or depth of color, moreover, the color of such materials changes concomitantly with temporal changes in the ferric oxide which constitutes the colored component of the rock; furthermore, since the said colorant is of natural origin, accurate reproduction of colors is difficult. On the other hand, composite materials employing colored glass do convey an impression of transparency and are suited for mass production. However, in the case of composite materials prepared with finely powdered glass, since the glass powder is colored with organic pigments, the weather resistance of the product with respect to ultraviolet radiation is poor. As for composite materials prepared with crushed glass colored with metallic ions or colloids, the range of color selection for such composite materials is limited. Lastly, since composite materials prepared with aluminum hydroxide powder are generally colored with organic pigments, such composite materials are subject to considerable fading.

Next, the use, as color filters, of a composite layer comprising a transparent substrate and a colored layer superposed upon this substrate will be explained below.

Color filters are classified in accordance with their uses, as follows;

(1) Color correction filters in VTR cameras, facsimile machines, illumination meters, etc.

(2) Color separation filters in liquid crystal displays, CRT displays, etc.

(3) Contrast correction, color temperature conversion and neutral density filters in general photographic applications.

(4) Special purpose filters for ultraviolet cutoff, etc.

(5) Color filters for traffic lights and window glass.

For example, with the color correction filters for a VTR camera, color corrections thereof are necessary due to the large difference between human visibility and the sensitivity of a photoelectric conversion element (solid image pick-up element).

For example, color correction filters appropriate for the brightness of the scene and the color of the light source are necessary for photography. The types of filters used for color correction in recent years comprise near infrared cutoff filters, ultraviolet cutoff filters, and three color filters, i.e., red (R), green (G), and blue (B).

FIGS. 10, 11, and 12 illustrate cross-sections of representative light receptors of conventional color sensors. The color sensor light receptor illustrated shown in FIG. 10 comprises a photomask IC 20 with spacers 19 arranged on its surface, and a film filter 21 located above the photomask IC 20, with a red (R), a green (G), a blue (B) filter strayed in a plane on the surface of the film filter for the purpose of color separation, above which are situated an ultraviolet cutoff filter 22 and a near infrared cutoff filter 23. Translucent glass or a vapor deposition film is used as the near infrared cutoff filter 23, while translucent glass or an organic film is used as the ultraviolet cutoff filter 22. The sensor light receptor illustrated in FIG. 11 has, in place of the film filter 21 shown in FIG. 10, a printed filter 25. On this printed filter 25, red, green, and blue colored layers 21 are formed by the printing of dyes on the surface of the translucent glass substrate 24 opposing the photomask IC 20. The light sensor receptor illustrated in FIG. 12 employs, in place of the film filter shown in FIG. 10 or the printed filter 25 shown in FIG. 11, a glass filter 26 comprising red, green, and blue colored glass filter elements. The colored elements of this glass filter 26 do not fade upon exposure to ultraviolet rays, and therefore the above-mentioned ultraviolet cutoff filter 22 is not required in this case.

Conventional color filters may be classified as follows;
(1) Organic film filters, formed by dispersing a coloring dye or pigment in an organic resin film, such as a polyethylene film, etc.
(2) Filters formed on a glass substrate by printing or electrodepositing and drying a mixture of gelatin or an organic resin binder, such as a polyester resin, and a coloring dye or pigment.
(3) Glass filters colored by ions of transition metals such as Cuo or $La_2O_3$or rare earths, or precipitation of colloidal metals such as Au, or CdS, or colloidal compounds.
(4) Vapor deposited metal filters, utilizing the light transmission characteristics of vapor deposited metals films.

The various problems associated with conventional color filters are as follows;

Organic film filters, printed filters, electrodeposited filters, etc., all employ organic substances as binders for dyes or pigments. Consequently, such filters are prone to fading upon exposure to ultraviolet rays. If dyes are used as a colorant, since the binder possesses no ultraviolet cutoff effect, then the dyes themselves are substantially faded by ultraviolet rays, and as a result the peak absorption wave length of the filter changes with the passage of time. In order to prevent this, the filter is covered with a substance such as crystal or quartz which can absorb ultraviolet radiation, or is placed in a vacuum to ensure long-term reliability, etc.

On the other hand, in glass filters, since the glass itself is colored by metal or metal ions contained in the glass, almost no fading results from exposure to ultraviolet radiation, however, as illustrated in FIG. 12, the glass filter requires a holder 28. Moreover, arbitrary control of the peak transmission wave length is more difficult compared with filters employing organic dyes or pigments. The fabrication of vapor deposited filters demands a great deal of time and labor, moreover, the range of absorption wave lengths and other optical characteristics of such filters is limited.

SUMMARY OF THE INVENTION

The composite layer of this invention, which overcomes the above-discussed and numerous other disadvantages and deficiencies of the prior art, comprises a substrate and a colored layer formed on the surface of the substrate, wherein the colored layer contains a transparent layer and a coloring agent dispersed within the transparent layer, the transparent layer is made of an inorganic gel or glass material, end the coloring agent contains at least one selected from the group consisting of dyes and pigments.

In a preferred embodiment, the substrate is made of glass or plastic material.

In a preferred embodiment, the inorganic material contains at least one element selected from the group consisting of silicon, germanium, titanium, zirconium, lead, boron, aluminum, phosphorus, arsenic, magnesium, calcium, strontium, barium, lithium, sodium, potassium, sulphur, selenium, tellurium, and fluorine.

In a preferred embodiment, the coloring agent is an organic dye.

In a preferred embodiment, the coloring agent is an organic pigment.

In a preferred embodiment, the coloring agent is formed from several kinds of dyes and/or several kinds of pigments having absorption peaks at different wave lengths.

In a preferred embodiment, the transparent layer is capable of absorbing ultraviolet radiation.

In a preferred embodiment, the colored layer is formed by the following steps comprising: preparing a colorant solution by dissolving or dispersing the coloring agent in an alkoxide or mercaptide solution, applying the colorant solution applied to the substrate, and drying and/or heating the substrate to which the colorant solution has been applied.

The method for the fabrication of the above-mentioned composite layer comprises: a process for the preparation of a colorant solution by dissolving or dispersing the coloring agent in a solution of an alkoxide or mercaptide, a process for the application of the colorant solution to the substrate, and a process for the formation of a colored layer on the surface of the substrate by drying and/or heating the substrate after the application of the colorant solution.

In a preferred embodiment, the comprises: a process for the application of the colorant solution to the substrate, and a process for the formation of a colored layer on the surface of the substrate by drying and/or heating the substrate after the application of the colorant solution, each the process being performed at least twice.

In a preferred embodiment, colorant solution contains, as a film-forming auxiliary, an organic compound selected from the group consisting of hydroxypropyl cellulose and hydroxyethyl cellulose.

The glass composite material of the invention contains the above-mentioned composite layer and a synthetic resin layer.

In a preferred embodiment, the composite layer is embedded within the synthetic resin layer.

In a preferred embodiment, the form of the composite layer is selected from the group consisting of particles, powders, filaments, fibers, globules, and flakes.

In a preferred embodiment, the form of the substrate is selected from the group consisting of particles, powders, filaments, fibers, globules, and flakes.

In a preferred embodiment, the content of the substrate is in the range of 30 to 80% by weight.

In a preferred embodiment, the substrate forming the composite layer is made of glass.

The method for the fabrication of the above-mentioned glass composite material comprises: a process for the preparation of a colorant solution by dissolving or dispersing the coloring agent in an alkoxide or mercaptide solution, a process for the application of the colorant solution to the substrate, a process for the formation of a colored layer on the surface of the substrate by drying and/or heating the substrate after the application of the colorant solution, and a process for the formation of a synthetic resin layer by kneading a composite layer having the substrate and the colored layer with a synthetic resin, and then hardening the synthetic resin.

In a preferred embodiment, further comprising a process for treating the surface of the substrate with a coupling agent prior to the application of the colorant solution to the substrate.

In a preferred embodiment, the colorant solution further contains a coupling agent.

The color filter of the invention have a transparent substrate and a colored layer formed on the surface of the substrate, wherein the colored layer contains a transparent layer and a coloring agent dispersed within the transparent layer, the transparent layer is made of an inorganic gel or glass material, and the coloring agent contains at least one selected from the group consisting of dyes and pigments.

Thus, the invention described herein makes possible the objectives of (1) Providing a composite layer so that no fading results from exposure to ultraviolet radiation, heat, or moisture (i.e., possessing excellent weather resistance);

(2) Providing a composite layer permitting an extremely great freedom of selection of the wave length peak of transmitted light when organic dyes or organic pigments are used for coloration;

(3) Providing a composite layer which can be fabricated with comparative ease;

(4) Providing color filters possessing the various aforesaid characteristics;

(5) Providing glass composite materials comprising the various aforesaid characteristics; and (6) Providing glass composite materials characterized by strong adhesion between the composite layers and synthetic resin layers.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
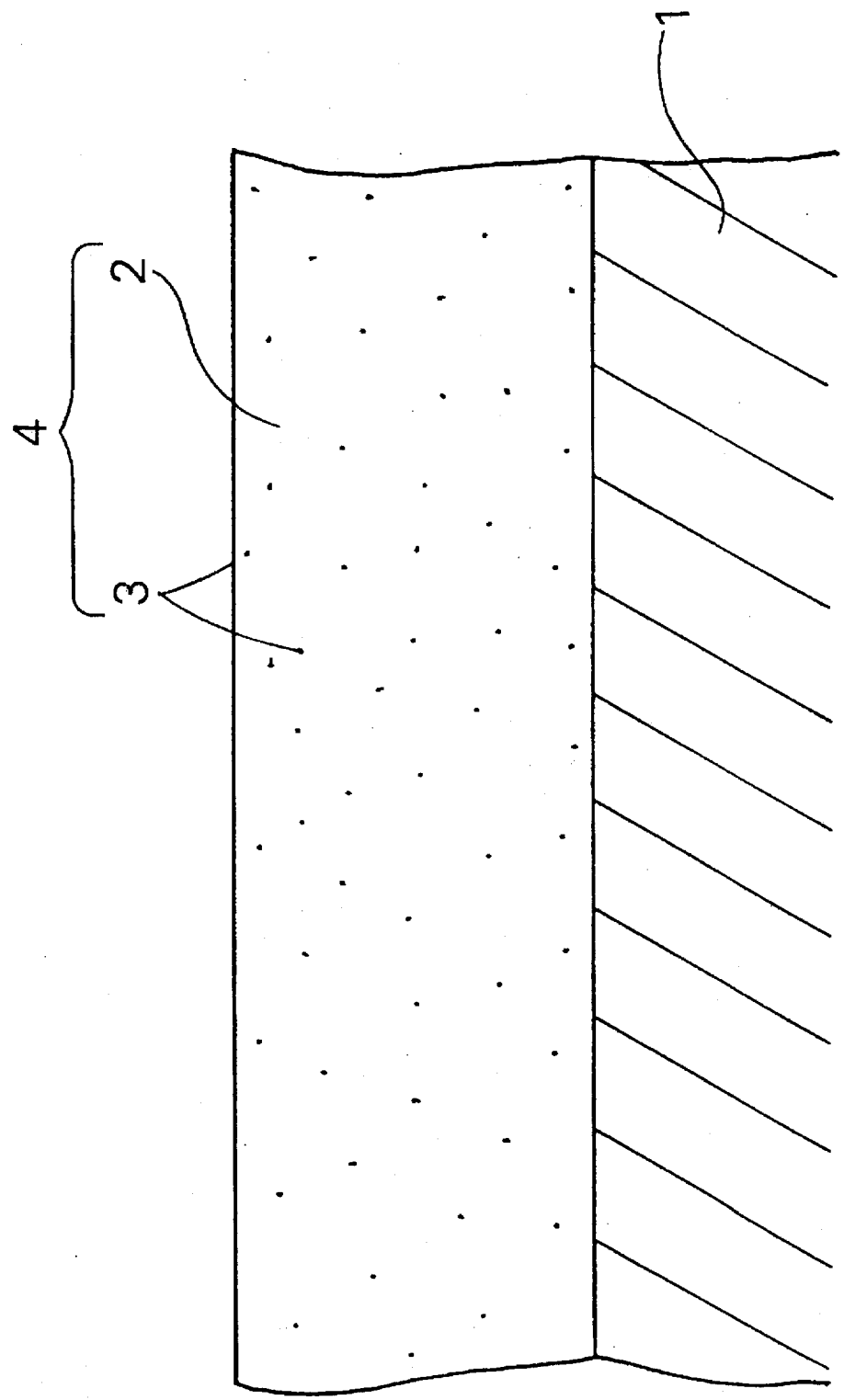
FIG. 1 shows a cross-sectional view of the essential portion of one embodiment of the type of composite layer according to the present invention.

As indicated in FIG. 1, a composite layer of the present invention comprises a substrate 1 and a colored layer 4 formed on the surface of the substrate 1. When the substrate 1 assumes the form of a plate, the colored layer 4 may be formed on either one or both sides of the substrate 1. The substrate 1 may be formed from transparent glass or plastic.

The colored layer 4 contains a transparent layer 2 and a coloring agent 3 dispersed within the transparent layer 2. The transparent layer 2 is composed of an inorganic gel or glass material, while the coloring agent 3 contains at least one selected from the group consisting of dyes and pigments.

The colored layer is formed in the following manner. A colorant solution is prepared by dissolving or dispersing a coloring agent in an alkoxide or mercaptide solution. Next, the colorant solution is coated onto the substrate, then the substrate, coated with the colorant solution, is dried and/or heated.

This drying and/or heating process results in the formation of a transparent layer of inorganic gel or glass from the alkoxide or mercaptide by a dehydration-condensation reaction. If the dehydration-condensation reaction is incomplete, then a transparent layer of gel is formed, whereas if the said dehydration-condensation reaction is complete, then a transparent layer of glass is formed. The coloring agent is uniformly dispersed within the aforesaid transparent layer. Since the dehydration-condensation reaction is conducted at relative low temperature, the coloring agent is sealed into the transparent layer without decomposition.

The thickness of the colored layer is preferably 10 micrometers or less. The materials from which the transparent layer is formed may contain one or more elements selected from the group consisting of silicon, germanium, titanium, zirconium, lead, boron, aluminum, phosphorus, arsenic, magnesium, calcium, strontium, barium, lithium, sodium, potassium, sulphur, selenium, tellurium, and fluorine. The transparent layer may be formed from soda glass, borosilicate glass, lead glass, or natural quartz.

Thus, the transparent layer is formed of inorganic materials, hence, weather resistance is superior to that of transparent layers formed of conventional organic materials such as alkyd resins. Moreover, since a transparent layer formed from inorganic materials can prevent the passage of ultraviolet rays, fading effects can also be diminished.

The coloring agent used for the purposes of the present invention is preferably an organic dye or organic pigment.

For example, organic dyes or organic pigments in the category of azo, anthraquinone, naphthoquinone, perylene, indigo, fluorenone, phenazine, phenothiazine, polymethine, polyene, diphenylmethane, triphenylmethane, acridine, phthalocyanine can be used.

Examples of organic dyes or pigments suitable for the purpose of the present invention are as follows.

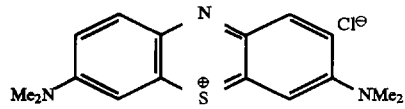

(a) Methylene blue

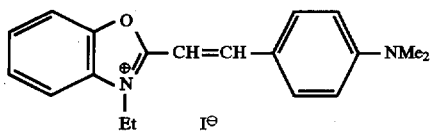

(b) 2-(p-dimethylaminostyryl)-3-ethylbenzooxazolium iodide

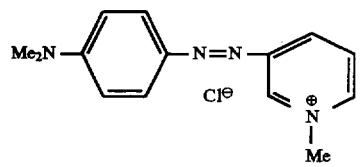

(c) 3-(4'-dimethylaminophenylazo)-pyridinium chloride

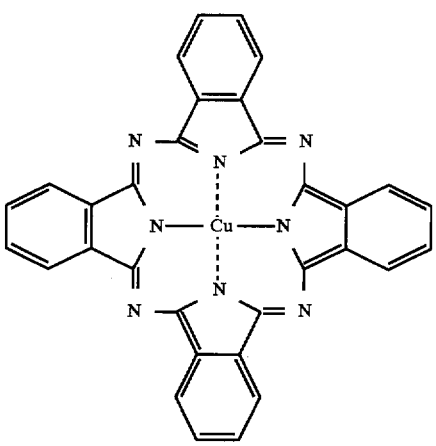

(d) Copper phthalocyanine

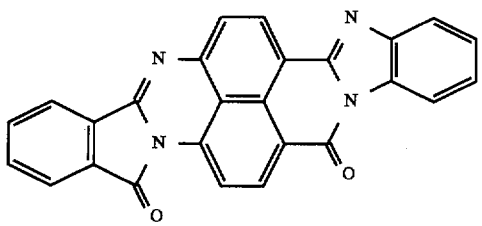

(e) Phthaloperinone

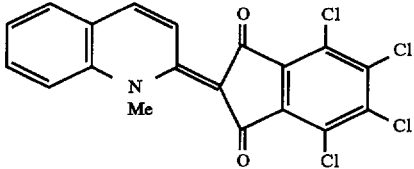

(f) 4,5,6,7,-tetrachloroquinophthalone

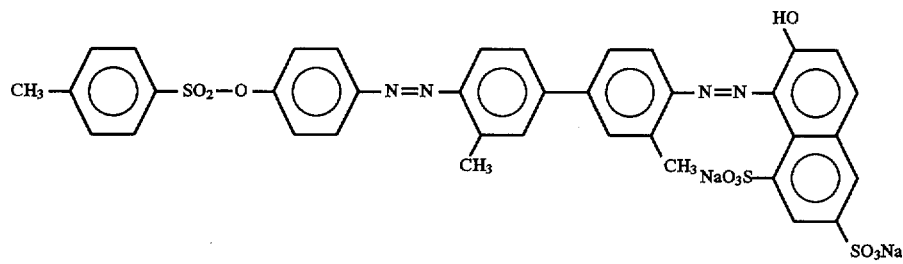

(g) An azo type dye

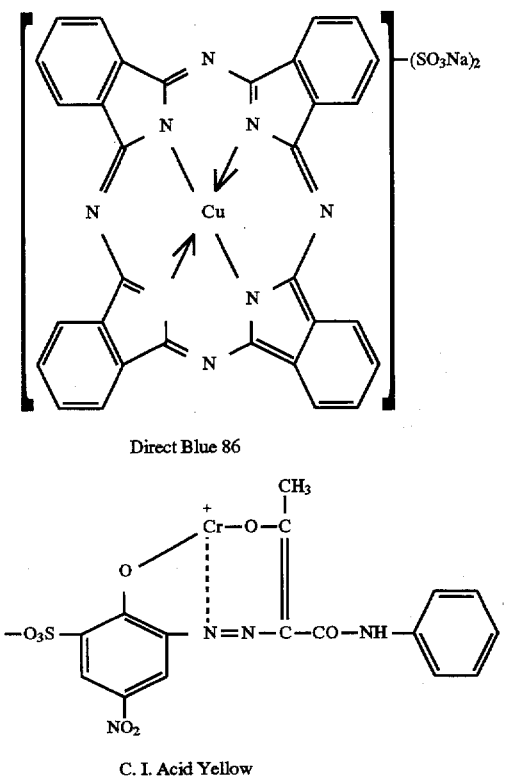

Direct Blue 86

C. I. Acid Yellow (h) A mixture of Direct Blue 86 and C. I. Acid Yellow

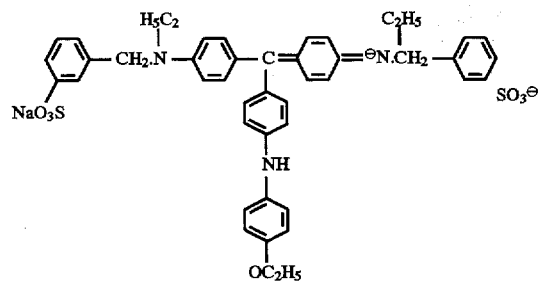

(i) A triphenylmethane dye

In addition, inorganic pigments may also be used as coloring agents for this purpose.

Figure 2:
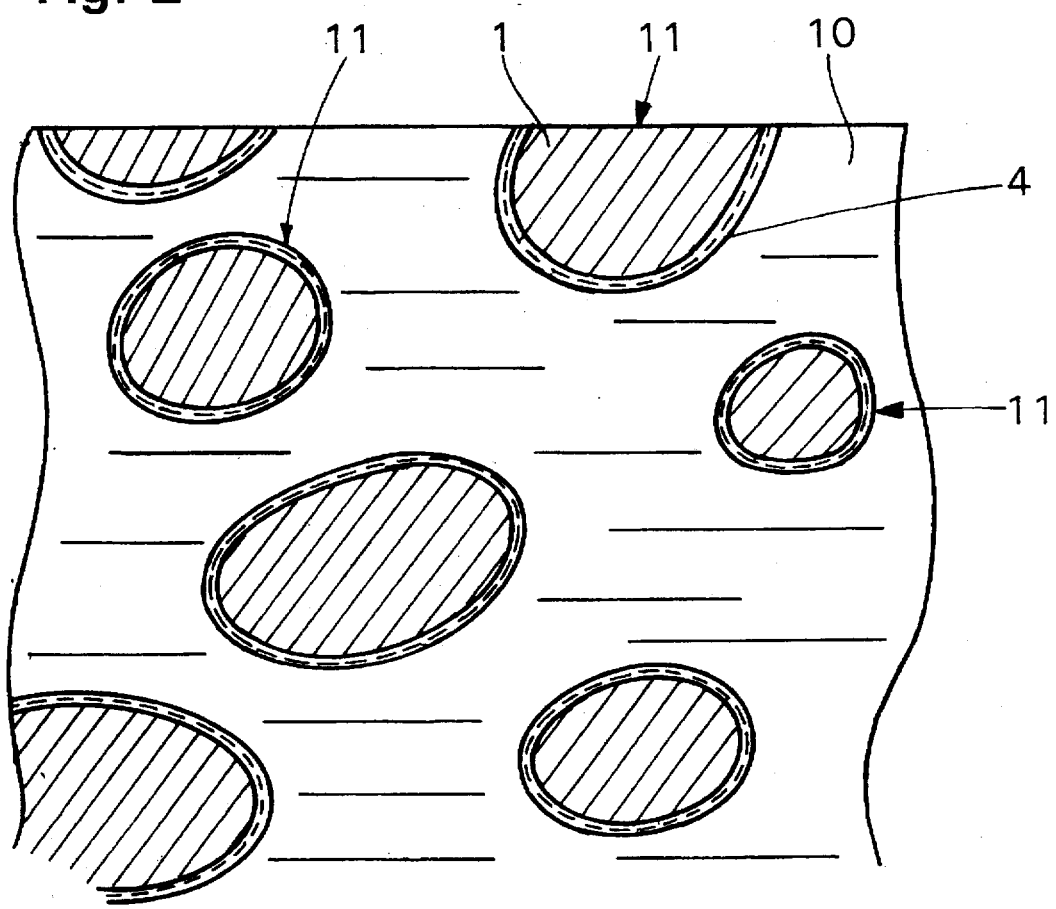
FIG. 2 shows a cross-sectional view of the essential portion of one embodiment of the type of glass composite material according to the present invention.

The glass composite materials of the present invention comprise a layered material obtained in the aforesaid manner and a layer composed of synthetic resin. The synthetic resins suitable for the present purpose include, for example, unsaturated polyester resins. One example of such a glass composite material is shown in FIG. 2. The glass composite material consists of a synthetic resin layer 10 and a layered material 11 embedded in this synthetic resin layer 10. The layered material 11 is of particulate form, and dispersed within the synthetic resin layer 10. The colored layer 4 on the surface of the layered material 11 is formed from an alkoxide or mercaptide as the starting material, hence, hydroxyl groups remain in the colored layer 4, and these residual hydroxyl groups act as a coupling agent, permitting a more intimate bonding between the synthetic resin layer 10 and the substrate 1. The shape and dimensions of the layered material 11 can be specified arbitrarily.

EXAMPLES

In the sequel, the present invention will be described in further detail with reference to specific examples.

Example 1

0.1 g of methylene blue was dissolved in 50 ml of ethanol, 25 g of tetraethoxysilane was added to this solution, and the mixture was thoroughly agitated. Next, 23.5 g of an aqueous solution containing 0.3 ml of hydrochloric acid was added, and the mixture was stirred at room temperature for 10 minutes, thereby preparing a solution designated as A-1. Also, another solution, designated as B-1, was prepared in entirely the same manner as A-1, except for the use of 2-(p-dimethylaminostyryl)-3-ethyl-benzooxazolium iodide in place of methylene blue. Likewise, still another solution, designated as C-1, was prepared in entirely the same manner as A-1, except for the use of 3-(4'-dimethylaminophenylazo)-pyridinium chloride in place of methylene blue. Then, 200 g of crushed glass particles with a grain size of 3 mm were immersed in each of the solutions A-1, B-1, and C-1 obtained as indicated above. After drying at room temperature, the mixtures were heated for 60 minutes at 100° C., thereby forming a gel film on the surfaces of the glass particles. The colored glass particles formed using the solutions A-1, B-1, and C-1 displayed blue, red, and yellow colors, respectively.

Example 2

Figure 3:
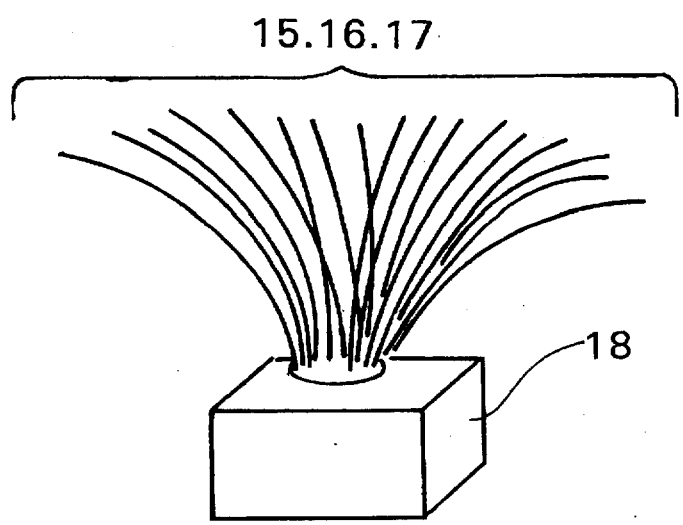
FIG. 3 shows an oblique view of an ornament fabricated using the type of composite layer according to the present invention.

0.2 g of copper phthalocyanine was dispersed in a mixed solution of 50 ml of ethanol end 40 g of hydroxypropyl cellulose, then this solution was added to 25 g of tetraethoxysilane and the mixture was thoroughly stirred. Next, 23.5 g of an aqueous solution containing 0.3 ml of hydrochloric acid was added, and the mixture was stirred at room temperature for 10 minutes, thereby preparing a solution designated as D-1. Also, another solution, designated as E-1, was prepared in entirely the same manner as D-1, except for the use of phthaloperinone in place of copper phthalocyanine. Likewise, still another solution, designated as F-1, was prepared in entirely the same manner as D-1, except for the use of 4,5,6,7,-tetrachloroquinophthalone in place of copper phthalocyanine. Then, glass filaments of 0.3 mm diameter and 500 mm in length were coated with each of the solutions D-1, E-1, and F-1 obtained as indicated above, and heated for 60 minutes at 100° C., thereby forming a gel film on the surfaces of the glass filaments. The colored glass filaments formed using the solutions D-1, E-1, and F-1 displayed blue, red, and yellow colors, respectively. Table 1 shows the peak absorption wave length of the colored glass filaments obtained by the method of the present Example 2. FIG. 3 shows an example of an ornament employing the colored glass filaments obtained by the method of the present Example 2. This ornament is composed of a group (15, 16, 17) of glass filaments with three colors and a light-emitting unit 18.

TABLE 1

| Pigment added | Peak absorption wave length |
|---|---|
| Copper phthalocyanine | 660 nm |
| Phthaloperinone | 520 nm |
| 4,5,6,7-tetra-chloroquinophthalone | 430 nm |

Example 3

The colored glass particles obtained as indicated in the description of Example 1 above were mixed with an unsaturated polyester resin in a weight ratio of 50:50, then, 2 weight parts each of a cure accelerator, a catalyst, and a low shrinkage agent were added to 100 parts of the mixture so obtained, and the mixture was thoroughly stirred. The constituents mixed in this manner were then poured into a mold, and thermally hardened for 100 minutes at 100° C. The hardened mass was then removed from the mold, and the surface of the mass was polished, thus obtaining a glass composite material.

Example 4

Acetylacetone was added to an ethanol solution of titanium tetrabutoxide, then methylene blue was added, and the solution was agitated for 20 minutes.

Then, to the solution so obtained were added glass particles of a mean grain size of 0.5 mm. Next, the glass particles were lifted out of the solution and heated for 5 hours at 120° C. The colored glass particles so obtained were then mixed with an unsaturated polyester resin, a silicone coupling agent, a curing averator, and a low shrinkage agent in the weight ratio 50:50:2:2:2. The constituents mixed in this manner were poured into a mold, and thermally hardened for 100 minutes at 100° C. The hardened mass was then removed from the mold, and the surface of the mass was polished, thus obtaining a glass composite material.

Example 5

A composite glass material was obtained by the same procedure as was used in the preparation of Example 4, except that the solution for immersion of the glass particles was prepared with added hydroxypropyl cellulose.

Example 6

Water was added to a mixed solution of tetramethoxysilane and methanol, thereby obtaining a methanol solution wherein a portion of the tetramethoxysilane had been hydrolyzed. Then, this methanol solution was mixed with a solution obtained by dissolving tetramethoxytitan in methanol, and the preparation of the solution was completed by adding 4,5,6,7,-tetrachloroquinophthalone to this mixture. Next, glass in the form of 1 mm×10 mm flakes, after prior surface treatment with a silicone coupling agent, were immersed in the aforesaid solution, after which a glass composite material was obtained by processing the colored glass so obtained by the same procedure as that used in the fabrication of Example 5.

Example 7

0.2 g of 3-(4'-dimethylaminophenylazo)-pyridinium chloride was added to 50 ml of an ethanol solution of methyltriethoxysilane, then 0.3 ml of hydrochloric acid was added to the mixture. Next, chip fiber glass was immersed for 10 minutes in the solution so obtained, then lifted out of the solution and dried at 100° C. for 60 minutes. Next, this glass was surface-coated with a silicone coupling agent. Finally, a glass composite material was obtained by processing the colored glass chip fibers obtained in this manner by the same procedure as that used in the fabrication of Example 5.

The principal characteristics of the layered materials and glass composite materials obtained in the Examples described above are shown in Table 2, along with two comparative examples. Comparative Example 1 is a glass bead material colored with an organic pigment, while Comparative Example 2 is an artificial marble composed of an organic pigment, glass powder, and a synthetic resin.

TABLE 2

|  |  | Range of color section | Mechanical strength | Weather resistance |
|---|---|---|---|---|
| Embodiment | 1 | Arbitrary | — | High |
|  | 2 | Arbitrary | — | High |
|  | 3 | Arbitrary | High | High |
|  | 4 | Arbitrary | Extremely high | High |
|  | 5 | Arbitrary | Extremely high | High |
|  | 6 | Arbitrary | Extremely high | High |
|  | 7 | Arbitrary | Extremely high | High |
| Comparative examples | 1 | Limited | — | Low |
|  | 2 | Limited | High | Low |

Example 8

Figure 4:
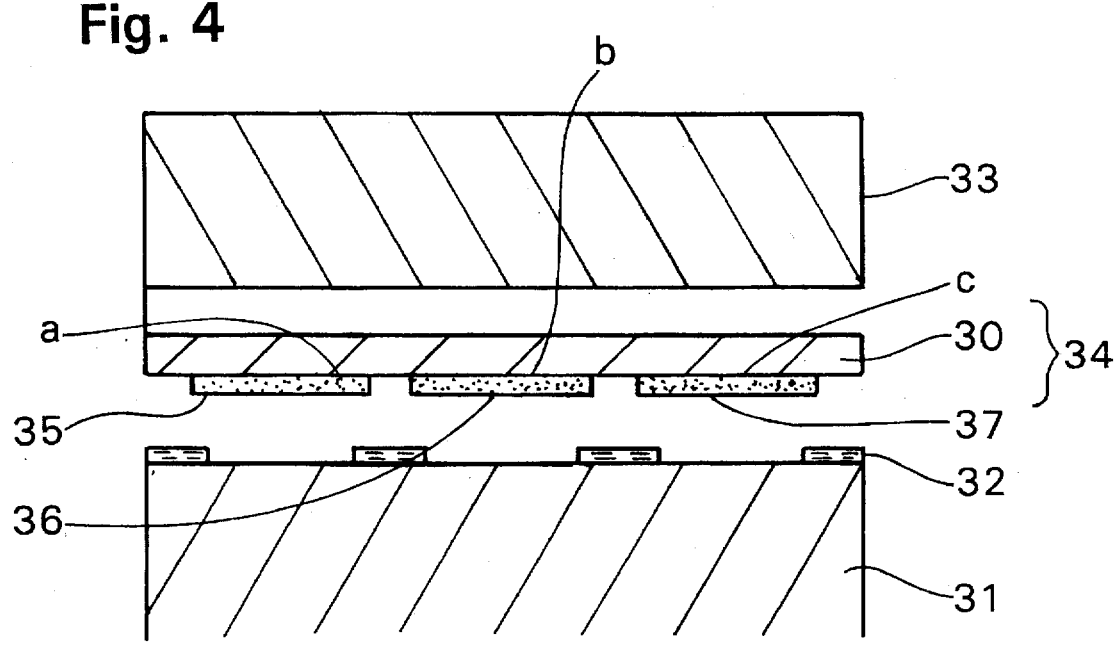
FIG. 4 shows a cross-sectional view of one embodiment of the type of color filter according to the present invention.

0.1 g of the azo type dye with the structure shown in diagram (a) above was dissolved in 50 ml of ethanol, then this solution was added to 25 g of tetraethoxysilane and the mixture was thoroughly stirred. Next, 23.5 g of en aqueous solution containing 0.3 ml of hydrochloric acid was added and the mixture was agitated at room temperature for 10 minutes, thereby preparing a solution designated as A-2. In addition, a solution designated as B-2 was obtained by the same procedure as was used in the preparation of solution A-2, except that a mixture of Direct Blue 86 and C. I. Acid Yellow, with the structures shown in diagram (b) above, was used in place of the dye (a) which was used in solution A-2. Furthermore, a solution designated as C-2 was obtained by the same procedure as was used in the preparation of solution A-2, except that the triphenylmethane type dye with the structure shown in diagram (c) above was used in place of the dye (a) which was used in solution A-2. Bach of the solutions A-2, B-2, and C-2 so obtained were coated onto the portions (a), (b), (c), respectively, of a #7059 glass substrate 30, as illustrated in FIG. 4, and after drying in air, the coated substrate was heated for 30 minutes in an electric oven, thereby forming the red, green, and blue colored films 35, 36, and 37, respectively. The thickness of the films 35, 36, and 37 so obtained was 500 nm. The filter obtained in this manner was the color separation filter 34, with the component red, green, and blue filters formed by the portions (a), (b), and (c), respectively. A color sensor receptor was constructed by assembling this color separation filter with a photomask IC 31, spacers 32, end a near infrared cut off filter 33.

Example 9

Figure 5:
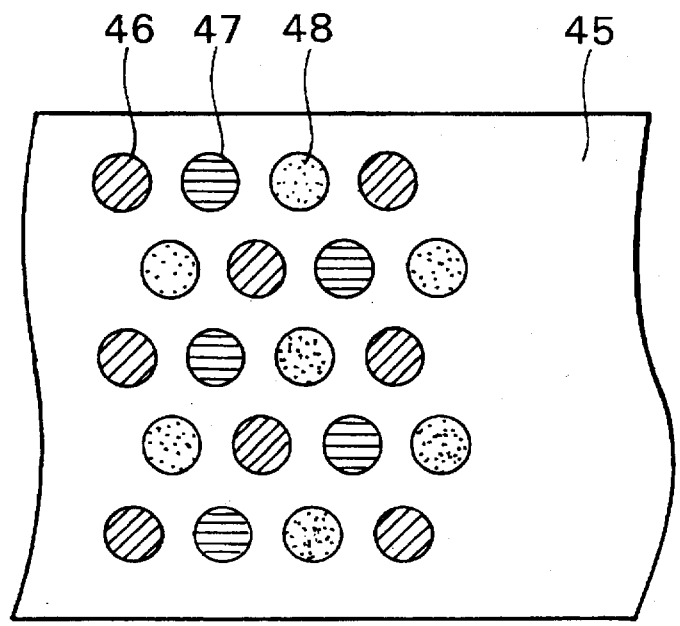
FIG. 5 shows a schematic diagram of a color filter for liquid crystal display obtained in Example 9.

Using a printing method, the solutions A-2, B-2, and C-2 obtained in Example 8 were coated onto a glass substrate 45, as illustrated in FIG. 5. Then, the substrate was heated in the same manner as in the preparation of Example 8, thereby forming red, green, and blue colored films 46, 47, and 48, respectively, and so obtaining a color filter suitable for liquid crystal displays.

Example 10

0.1 g of methylene blue was dissolved in 50 ml of ethanol, then this solution was added to 25 g of tetraethoxysilane and the mixture was thoroughly agitated. Next, 23.5 g of an aqueous solution containing 0.3 ml of hydrochloric acid was added, and the mixture was stirred at room temperature for 10 minutes, thereby preparing a solution designated as D-2. Also, another solution, designated as E-2, was prepared in entirely the same manner as D-2, except for the use of 2-(p-dimethylaminostyryl)-3-ethyl-benzooxazolium iodide in place of methylene blue. Likewise, still another solution, designated as F-2, was prepared in entirely the same manner as D-2, except for the use of 3-(4'-dimethylaminophenylazo)-pyridinium chloride in place of methylene blue. Then, each of the solutions D-2, E-2, and F-2 was applied to a #7059 glass substrate of thickness 0.5 mm by a dipping method, and the respective substrates were heated for 60 minutes at 100° C. thereby forming a gel films. Table 3 shows the peak absorption wave lengths of the respective filters obtained in this manner.

TABLE 3

| Dye added | Peak absorption wave length |
| --- | --- |
| Methylene blue | 620 nm |
| 2-(p-demethylaminostyryl)-3-ethyl-benzooxazolium iodide | 500 nm |
| 3-(4'-dimethylaminophenylazo)-pyridinium chloride | 440 nm |

Example 11

0.2 g of copper phthalocyanine was dispersed in a mixed solution of 50 ml of ethanol and 40 g of hydroxypropyl cellulose. Then this solution was added to 25 g of tetraethoxysilane and the mixture was thoroughly stirred. Next, 23.5 g of an aqueous solution containing 0.3 ml of hydrochloric acid was added, and the mixture was stirred at room temperature for 10 minutes, thereby preparing a solution designated as G. Also, another solution, designated as H, was prepared in the same manner as G, except for the use of phthaloperinone in place of copper phthalocyanine. Likewise, still another solution, designated as X, was prepared in the same manner as G, except for the use of 4,5,6,7,-tetrachloroquinophthalone in place of copper phthalocyanine. Then, each of the solutions G, H, and I was applied to both surfaces of a #7059 glass substrate with a thickness of 0.5 mm by a dipping method, and the respective substrates were heated at 100° C. for 60 minutes, thereby forming gel films. The peak absorption wave lengths of the respective color filters obtained in this manner were the same as those shown in Table 1.

Example 12

A solution was prepared by adding acetylacetone to an ethanol solution of zirconium tetrabutoxide, and then adding methylene blue to the mixture. The solution so obtained was sprayed onto a #7059 glass substrate with a thickness of 0.5 mm by a spray method and then was heated at 100° C. for 30 minutes, thereby forming a colored film.

Example 13

Water was added to a mixed solution of tetramethoxysilane and methanol, thereby obtaining a methanol solution in which a portion of the tetramethoxysilane had been hydrolyzed. Then, this methanol solution was mixed with a solution obtained by dissolving tetramethoxytitanium in methanol, and the preparation of the solution was completed by adding 4,5,6,7,-tetrachloroquinophthalone to this mixture. This solution was applied to the surface of a #7059 glass substrate with a thickness of 0.5 mm by a spin-coating method (3000 revolutions), and this coated substrate was heated at 150° C. for 60 minutes, thereby obtaining a colored film.

Example 14

A solution was prepared by adding 3-(4'-dimethylaminophenylazo)-pyridinium chloride and terpineol, as a thickener, to a ethanol solution of methyltriethoxysilane. This solution was applied to one surface of a transparent acrylic resin plate 1 mm in thickness by a screen printing technique, after which the plate was dried at 60° C. for 60 minutes, thereby forming a colored film.

Example 15

Figure 6:
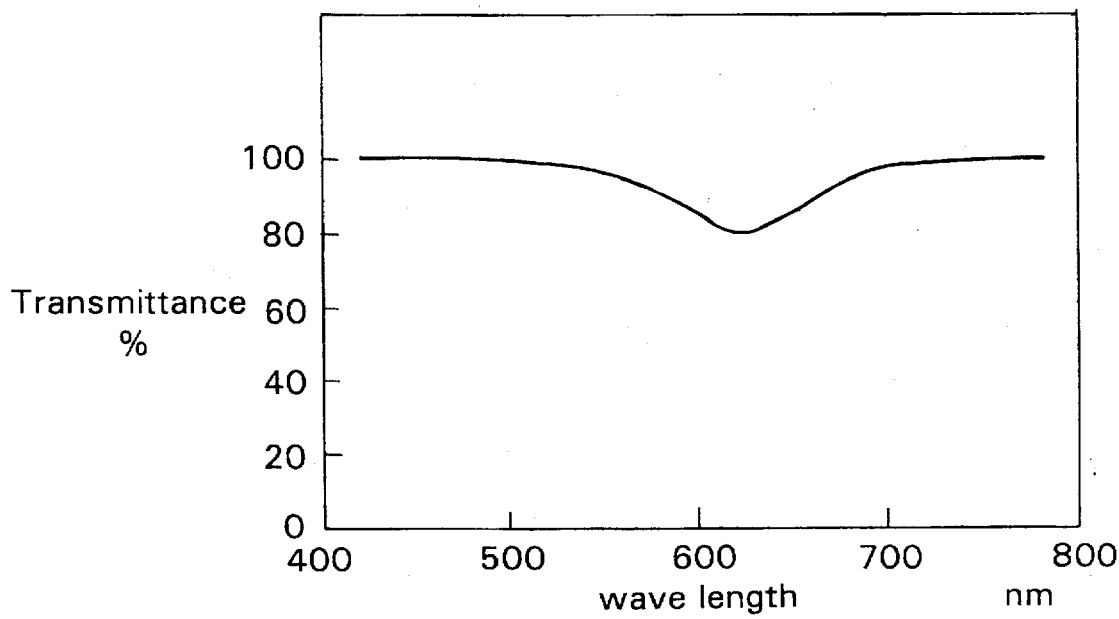
FIG. 6 shows a graph of the transmittance-wave length relationship of the color filter obtained in Example 15.
Figure 7:
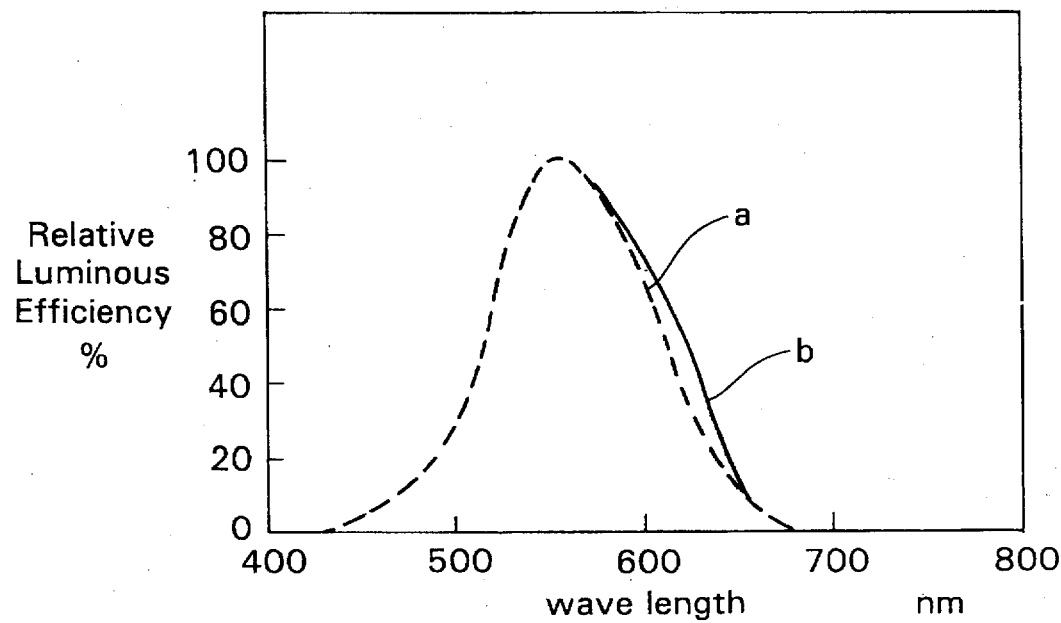
FIG. 7 shows an example of a spectrum luminous efficiency function and a color correction.

FIG. 6 is a graph showing the transmittance-wave length relationship of a color filter fabricated with the solution D-2 obtained in Example 10. This filter exhibits an absorption at around 620 nm, while light of the other wave lengths is transmitted very well. Therefore, this filter can be effectively used for luminosity correction. That is, as shown in FIG. 7, by using the aforesaid filter, the relative luminosity curve (indicated by the solid line (b)), which, owing to high sensitivity at 620 nm, deviates from a curve (showing the standard relative luminous efficiency function V(lambda)) indicated by the broken line (a), can be corrected so as to coincide with the latter curve (a). Thus, filters fabricated by the methods of the present invention are effective for applications requiring absorption only of specified wave lengths.

Example 16

Figure 8:
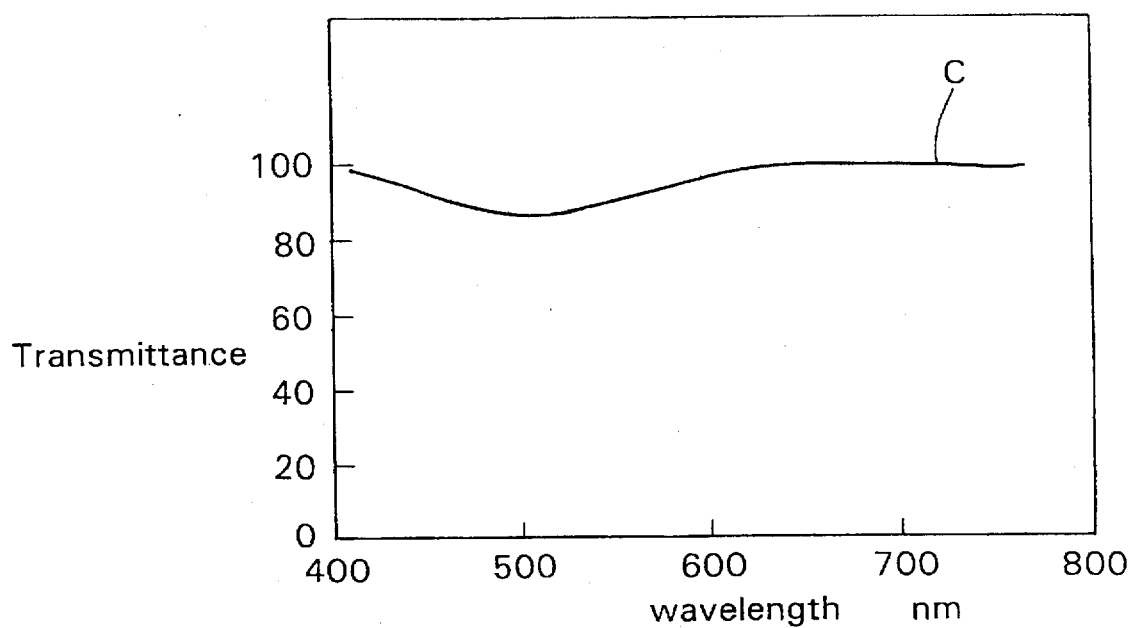
FIG. 8 shows a graph of the transmittance-wave length relationship of the color filter obtained in Example 16.
Figure 9:
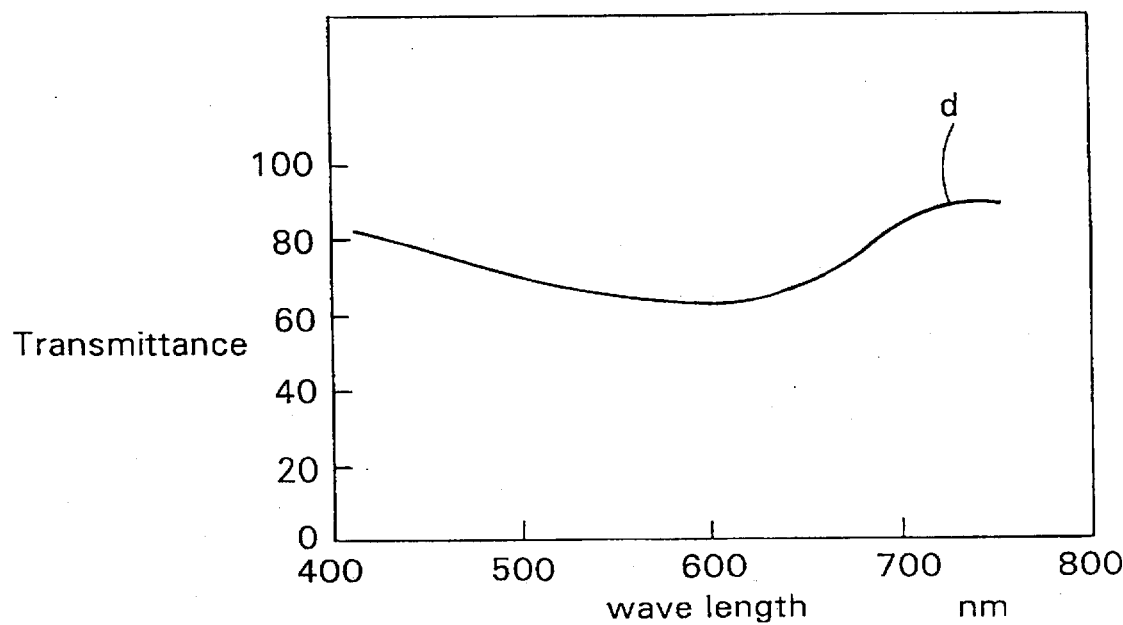
FIG. 9 shows a graph of the transmittance-wave length relationship of the color filter obtained in Example 16.

The absorption wave lengths of the color filters can be adjusted by mixing a plurality of dyes. FIG. 8 is a graph showing the transmittance-wave length relationship of a color filter fabricated with the solution E-2 obtained in Example 10, while FIG. 9 is a graph showing the transmittance-wave length relationship of a color filter fabricated by coating and drying a mixture of solutions E-2 and D-2 onto a glass substrate. The transmittance curve (d) shown in FIG. 9 corresponds to the sum of the transmittance curve (a) of a filter fabricated using solution D-2 and the transmittance curve (c) of a filter fabricated using solution E-2. Thus, by using mixed solutions of several dyes with different absorption wave lengths, the absorption wave lengths of the color filters so obtained can be controlled. The same effect as above can also be obtained by superimposing a filter fabricated from solution D-2 and a filter fabricated from solution E-2.

Figure 10:
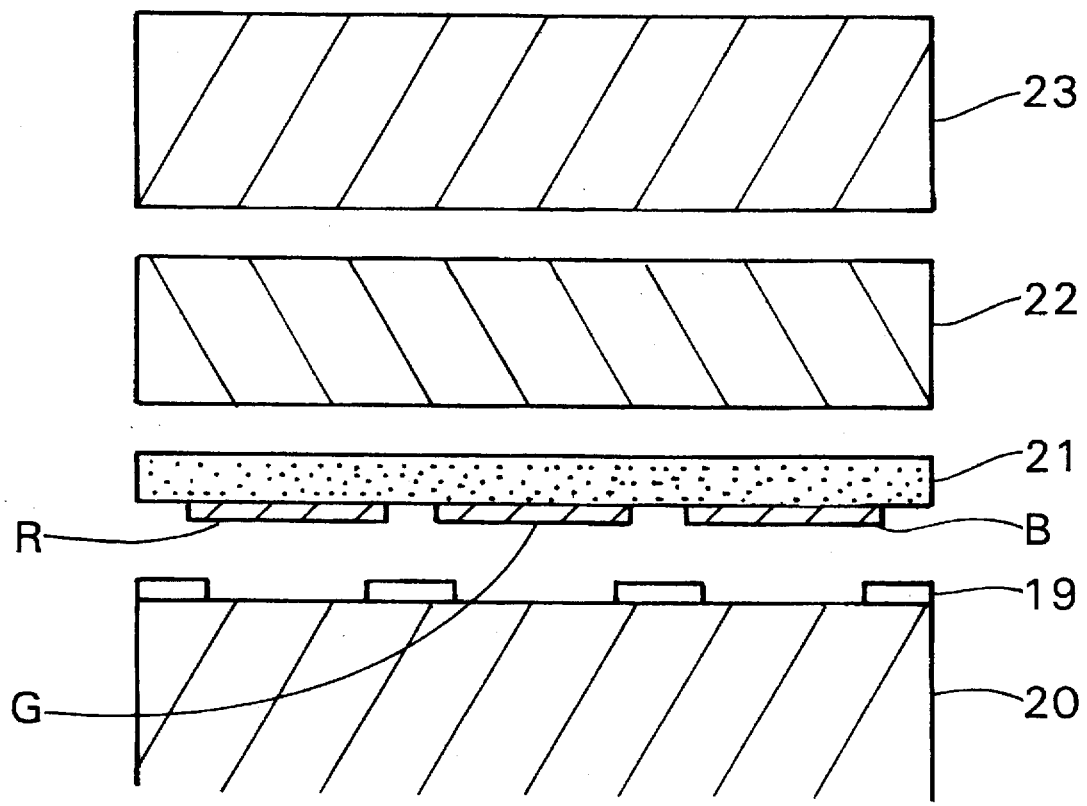
FIG. 10 shows a cross-sectional view of a color sensor light receptor fabricated using a conventional type of color filter.
Figure 11:
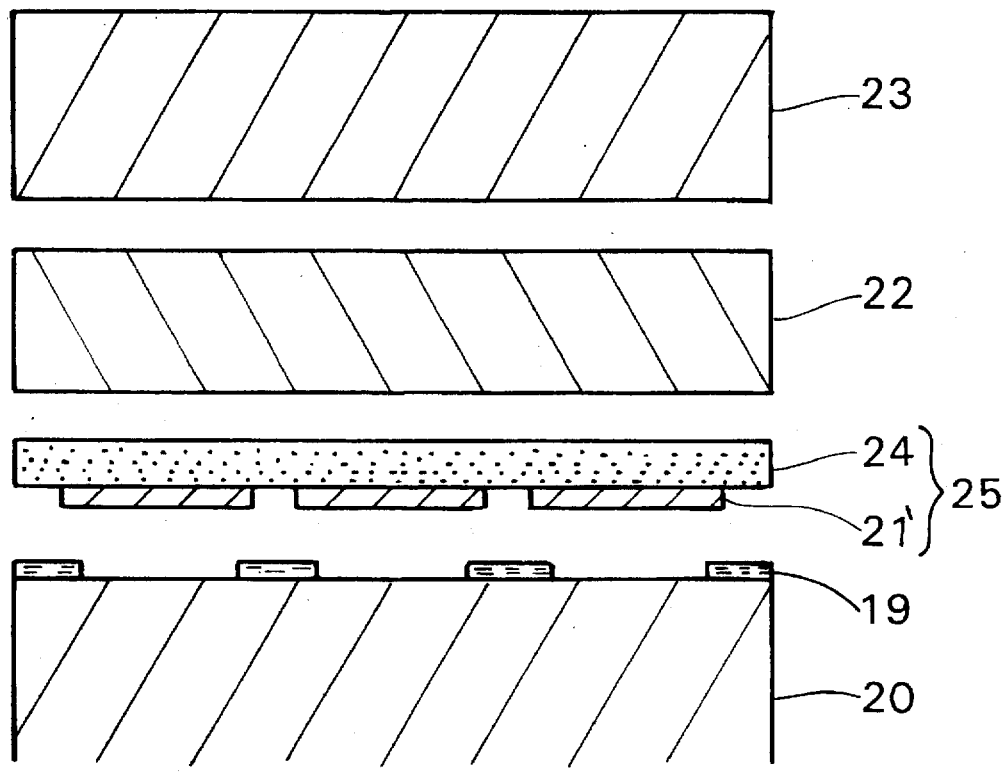
FIG. 11 shows a cross-sectional view of a color sensor light receptor fabricated using another conventional type of color filter.
Figure 12:
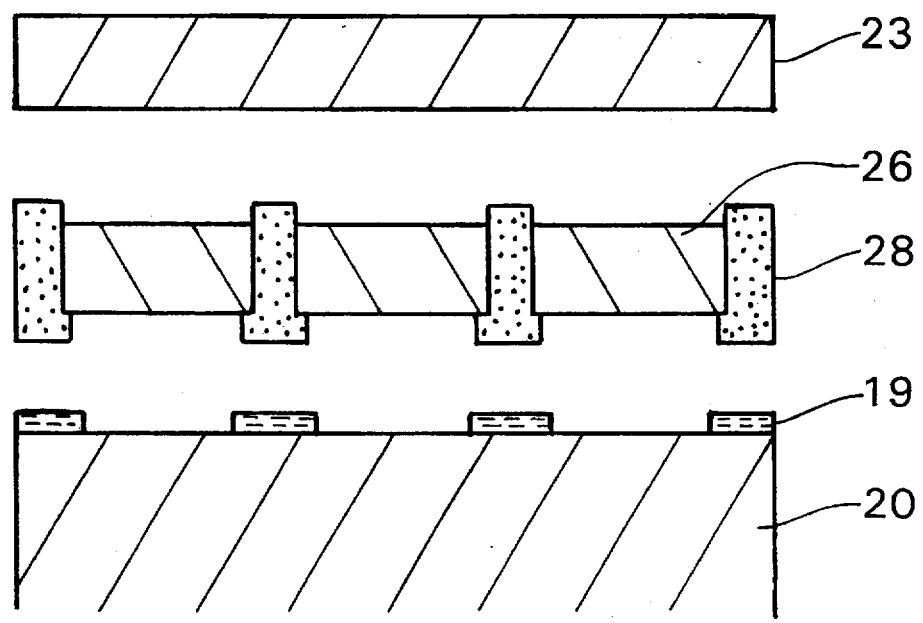
FIG. 12 shows a cross-sectional view of a color sensor light receptor fabricated using still another conventional type of color filter.

The principal characteristics of the color filters obtained in the Examples 8–14 described above are shown in Table 5, along with two comparative examples. Comparative Example 3 is a color sensor light receptor employing an organic film filter of the type illustrated in FIG. 10, while Example 4 is a color sensor light receptor employing a printed film of the type illustrated in FIG. 11.

TABLE 4

| | | Changes in wave length dependence of transmittance at 70° C. and 90% relative humidity | Long-term reliabilty |
| --- | --- | --- | --- |
| Embodiment | 8 | None | No fading by UV radiation |
| | 9 | None | No fading by UV radiation |
| | 10 | None | No fading by UV radiation |
| | 11 | None | No fading by UV radiation |
| | 12 | None | No fading by UV radiation |

TABLE 4-continued

|  |  | Changes in wave length dependence of transmittance at 70° C. and 90% relative humidity | Long-term reliabilty |
|---|---|---|---|
|  | 13 | None | Extremely high weather resistance |
|  | 14 | None | Excellent adhesion to plastic substrates |
| Comparative examples | 3 | Transmitted wave lengths shifted | UV cutoff filter required |
|  | 4 | Transmitted wave lengths shifted | UV cutoff filter required |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A color filter comprising a transparent substrate and a colored layer formed on the surface of said substrate, wherein said colored layer consists essentially of a transparent layer and a coloring agent dispersed within said transparent layer and has a thickness of 10 μm or less so as to transmit light, said transparent layer comprises a gel or glass material made from an alkoxysilane solution, and said coloring agent contains at least one pigment having absorption peaks for visible light at selected wavelengths.

2. A color filter according to claim 1, wherein said substrate is made of glass or plastic material.

3. A color filter according to claim 1, wherein said coloring agent is an organic pigment.

4. A color filter according to claim 1, wherein said coloring agent is at least one pigment having absorption peaks at different wavelengths.

5. A color filter according to claim 1, wherein said transparent layer is capable of absorbing ultraviolet radiation.

6. A color filter according to claim 1, wherein said color layer is formed by the following steps comprising:

preparing a colorant solution by dispersing said coloring agent in an alkoxysilane solution, applying said colorant solution to said substrate, and drying or heating said substrate to which said colorant solution has been applied.

7. A color filter according to claim 1, wherein said alkoxysilane is selected from the group consisting of tetraethoxysilane, tetramethoxysilane and methyltriethoxysilane.

8. A color filter according to claim 1, wherein said coloring agent is selected from the group consisting of pigments in the category of azo, anthraquinone, naphthoquinone, perylene, indigo, fluorenone, polymethine, polyene, acridine and phthalocyanine.

9. A color filter according to claim 1, wherein said coloring agent is selected from the group consisting of copper phthalocyanine, phthaloperinone, and 4,5,6,7-tetrachloroquinophthalone.

10. A color filter according to claim 1, wherein said transparent layer further contains a hydroxypropyl cellulose.

11. A color filter according to claim 1, wherein said colored layer is formed on each of both surfaces of said substrate.

12. A color filter comprising a transparent substrate and a colored layer formed on the surface of said substrate, wherein said colored layer consists essentially of a transparent layer and a coloring agent dispersed within said transparent layer and has a thickness of 10 μm or less so as to transmit light, said transparent layer comprises a gel or glass material made from an alkoxide solution of zirconium, and said coloring agent contains at least one pigment having absorption peaks for visible light at selected wavelengths.

13. A color filter comprising a transparent substrate and colored layer formed on the surface of said substrate, wherein said colored layer consists essentially of a transparent layer and a coloring agent dispersed within said transparent layer and has a thickness of 10 μm or less so as to transmit light, said transparent layer comprises a gel or glass material made from mixing a solution of alkoxide of titanium and alkoxide of silicon, and said coloring agent contains at least one pigment having absorption peaks for visible light at selected wavelengths.

14. A color filter comprising a transparent substrate and a colored layer formed on the surface of said substrate, wherein said colored layer consists essentially of a transparent layer and a coloring agent dissolved or dispersed within said transparent layer and has a thickness of 10 μm or less so as to transmit light, said transparent layer comprises a gel or glass material made from an alkoxysilane solution, and said coloring agent contains at least one pigment having absorption peaks for visible light at selected wavelengths and is present in such an amount that said filter exhibits absorption peaks at selected wavelengths and substantially no absorption peaks at wavelengths different from the selected wavelengths.

* * * * *